(12) United States Patent
Wang

(10) Patent No.: US 10,721,455 B2
(45) Date of Patent: Jul. 21, 2020

(54) THREE DIMENSIONAL OUTLINE INFORMATION SENSING SYSTEM AND SENSING METHOD

(71) Applicant: LEADOT INNOVATION, INC., Kaohsiung (TW)

(72) Inventor: Justin Wang, Taipei (TW)

(73) Assignee: LEADOT INNOVATION, INC., Kaohsiung (TW)

( * ) Notice: Subject to any disclaimer, the term of this patent is extended or adjusted under 35 U.S.C. 154(b) by 67 days.

(21) Appl. No.: 15/297,116

(22) Filed: Oct. 18, 2016

(65) Prior Publication Data
US 2017/0124716 A1     May 4, 2017

(30) Foreign Application Priority Data
Nov. 4, 2015   (TW) .............................. 104136247 A

(51) Int. Cl.
*H04N 13/207*     (2018.01)
*G06T 7/571*      (2017.01)

(52) U.S. Cl.
CPC ........... *H04N 13/207* (2018.05); *G06T 7/571* (2017.01); *G06T 2200/08* (2013.01); *G06T 2207/10016* (2013.01); *G06T 2207/10148* (2013.01)

(58) Field of Classification Search
None
See application file for complete search history.

(56) References Cited

U.S. PATENT DOCUMENTS

| | | | |
|---|---|---|---|
| 5,151,609 | A | 9/1992 | Nakagawa |
| 5,594,235 | A | 1/1997 | Lee |
| 6,692,716 | B1 | 2/2004 | Sieckmann |
| 2002/0071125 | A1 | 6/2002 | Sieckmann |
| 2004/0228520 | A1* | 11/2004 | Dresser ............. G06K 9/00134 382/154 |

FOREIGN PATENT DOCUMENTS

| | | | |
|---|---|---|---|
| CN | 102879993 A | 1/2013 | |
| DE | 101 49 357 A1 | 4/2002 | |
| DE | 10149357 A1 * | 4/2002 | ............. G01B 11/24 |
| DE | 10 2004 047 928 A1 | 4/2006 | |
| JP | S61124809 A | 6/1986 | |
| JP | H0363507 A | 3/1991 | |
| JP | H09145318 A | 6/1997 | |
| JP | 2001251648 A | 9/2001 | |
| JP | 20122537 A | 1/2012 | |
| JP | 201455815 A | 3/2014 | |

* cited by examiner

*Primary Examiner* — James M Anderson, II
(74) *Attorney, Agent, or Firm* — Winston Hsu

(57) ABSTRACT

A three dimensional outline information sensing system includes a variable focus image capturing device, and a processing unit. The variable focus image capturing device is configured to continuously capture a plurality of two dimensional images of an object at a plurality of focal lengths. The processing unit is configured to remove out-of-focus parts of the plurality of two dimensional images and keep on-focus parts of the plurality of two dimensional images, and obtain three dimensional outline information of the object by stacking the on-focus parts of the plurality of two dimensional images according to corresponding focal lengths of the plurality of two dimensional images.

9 Claims, 4 Drawing Sheets

THREE DIMENSIONAL OUTLINE INFORMATION SENSING SYSTEM AND SENSING METHOD

BACKGROUND OF THE INVENTION

1. Field of the Invention

The present invention relates to a three dimensional outline information sensing system and a sensing method, and more particularly, to a three dimensional outline information sensing system and a sensing method capable of obtaining three dimensional outline information according to a plurality of two dimensional images captured at different focal lengths.

2. Description of the Prior Art

A 3D scanner is a device for sensing and analyzing a shape of an object or surrounding in the real world. Data collected by the 3D scanner is used for performing three dimensional reconstruction in order to build a digital model of a real object. The 3D scanner can be realized according to various sensing techniques. Each technique has its limitations, advantages and disadvantages. Generally, there are contact type 3D scanners and non-contact type 3D scanners. The contact type 3D scanner identifies the shape of the object by actually contacting a surface of the object. The non-contact type 3D scanner obtains three dimensional outline information of the object by projecting energy onto the object and receiving energy reflected by the object. The projected energy can be visible light, high energy beam, ultrasound, or X-ray.

However, cost of the 3D scanner of the prior art is very high, and the 3D scanner of the prior art requires a lot of time to scan the object in order to build a three dimensional digital model of the real object. Therefore, efficiency of the 3D scanner of the prior art is lower.

SUMMARY OF THE INVENTION

The present invention provides a three dimensional outline information sensing system comprising a variable focus image capturing device and a processing unit. The variable focus image capturing device is configured to continuously capture a plurality of two dimensional images of an object at a plurality of focal lengths. The processing unit is configured to remove out-of-focus parts of the plurality of two dimensional images and keep on-focus parts of the plurality of two dimensional images, and obtain three dimensional outline information of the object by stacking the on-focus parts of the plurality of two dimensional images according to corresponding focal lengths of the plurality of two dimensional images.

The present invention further provides a three dimensional outline information sensing method comprising continuously capturing a plurality of two dimensional images of an object at a plurality of focal lengths by using a variable focus image capturing device; removing out-of-focus parts of the plurality of two dimensional images and keeping on-focus parts of the plurality of two dimensional images; and obtaining three dimensional outline information of the object by stacking the on-focus parts of the plurality of two dimensional images according to corresponding focal lengths of the plurality of two dimensional images.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
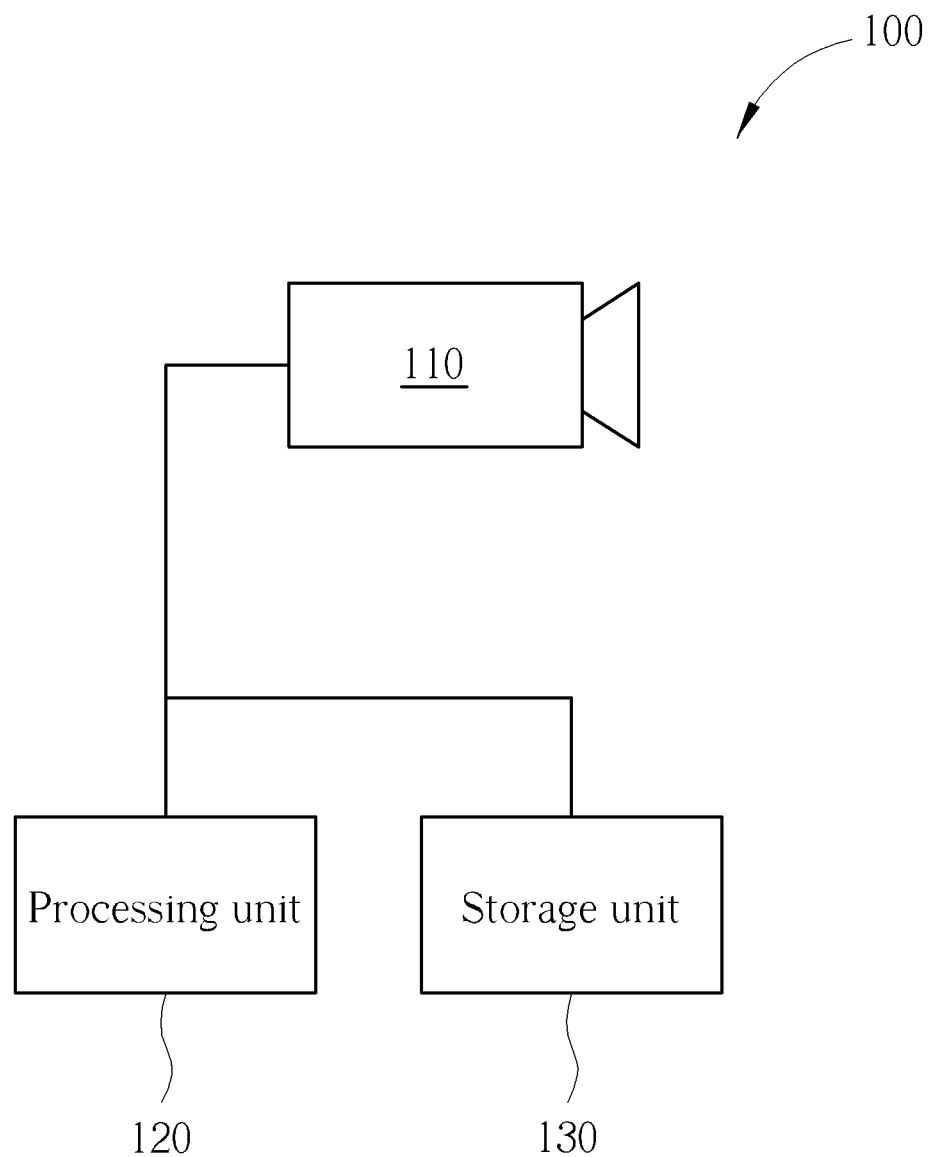
FIG. 1 is a diagram showing a three dimensional outline information sensing system according to a first embodiment of the present invention.

Please refer to FIG. 1. FIG. 1 is a diagram showing a three dimensional outline information sensing system according to a first embodiment of the present invention. As shown in FIG. 1, the three dimensional outline information sensing system 100 of the present invention comprises a variable focus image capturing device 110 and a processing unit 120. The variable focus image capturing device 110 is configured to continuously capture a plurality of two dimensional images of an object at a plurality of focal lengths. The processing unit 120 is electrically connected to the variable focus image capturing device 110 for receiving the plurality of two dimensional images captured by the variable focus image capturing device 110. The processing unit 120 is configured to obtain three dimensional outline information of the object according to the plurality of two dimensional images captured by the variable focus image capturing device 110. Notably, the processing unit 120 may be a microprocessor or an application-specific integrated circuit (ASIC). The storage unit 130 may be read-only memory (ROM), random-access memory (RAM), non-volatile memory (e.g., an electrically erasable programmable read only memory (EEPROM) or a flash memory), CD-ROMs, magnetic tapes, floppy disks, optical data storage devices, etc., and not limited herein.

Figure 2:
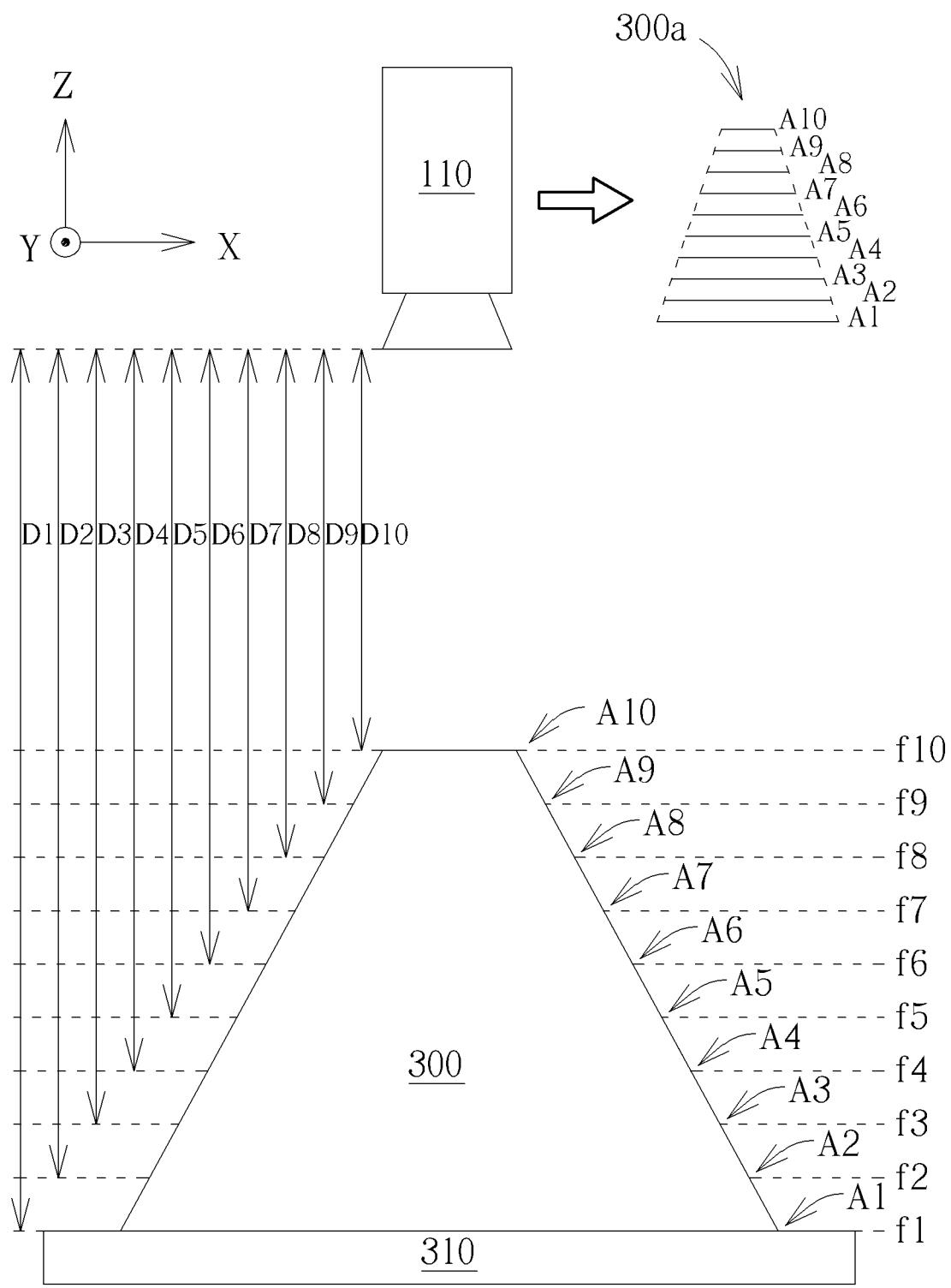
FIG. 2 is a diagram showing the three dimensional outline information sensing system in FIG. 1 sensing the three dimensional outline information of the object.

Please refer to FIG. 2, and refer to FIG. 1 as well. FIG. 2 is a diagram showing the three dimensional outline information sensing system in FIG. 1 sensing the three dimensional outline information of the object. As shown in FIG. 2, the variable focus image capturing device 110 is configured to continuously capture a plurality of (such as ten) two dimensional images of an object 300 at a plurality of focal lengths (such as focal lengths f1-f10). After the processing unit 120 receives the plurality of two dimensional images captured by the variable focus image capturing device 110, the processing unit 120 is configured to remove out-of-focus parts of the plurality of two dimensional images and keep on-focus parts of the plurality of two dimensional images, and further obtain three dimensional outline information of the object 300 by stacking the on-focus parts of the plurality of two dimensional images according to corresponding focal lengths of the plurality of two dimensional images of the object 300. For example, the variable focus image capturing device 110 can continuously capture ten two-dimensional images of the object 300 at a focal length f1 to a focal length f10. The processing unit 120 then removes the out-of-focus parts of the two dimensional images and keeps the on-focus parts A1-A10 of the two dimensional images, and further obtains three dimensional outline information of the object 300 by stacking the on-focus parts A1-A10 of the plurality of two dimensional images according to ratios of focus distances between the corresponding focal lengths of the plurality of two dimensional images. As such the processing unit 120 can build a three dimensional digital model 300a of the object 300. Although the three dimensional digital model 300a does not contain information of real sizes of the object 300 in different dimensions, the three dimensional digital model 300a still can represent an aspect ratio of the object 300.

On the other hand, if a distance D1 between the variable focus image capturing device 110 and a platform 310 (or a bottom of the object 300) along a Z-axis direction is known, the processing unit 120 can further compute distances D2-D10 between other on-focus parts A1-A10 of the object 300 and the variable focus image capturing device 110 along the Z-axis direction according to the camera imaging principle. Therefore, the three dimensional outline information can contain information of a real dimension of the object 300 along the Z-axis direction.

In addition, the processing unit 120 can further compute dimensions of the on-focus parts A1-A10 of the object 300 along X-axis and Y-axis directions according to a reference scale. For example, the platform 310 can be arranged with a reference scale for indicating a real size, and the processing unit 120 can use trigonometric formulas (or other similar formulas) to compute the dimensions of the on-focus parts A1-A10 of the object 300 along the X-axis and Y-axis directions according to the reference scale on the platform 310, the distances D1-D10, and size ratios between the on-focus parts A1-A10 in the two dimensional images.

After obtaining the distances D2-D10 and the dimensions of the on-focus parts A1-A10 along the X-axis and Y-axis directions, the processing unit 120 can obtain the three dimensional outline information of the object 300 containing information of real sizes of the object 300 in different dimensions, in order to further build a three dimensional digital module of the object 300 in real size. In the above embodiment, the variable focus image capturing device 110 can capture more two dimensional images of the object 300 at more focal lengths, such that resolution of the three dimensional outline information of the object 300 computed by the processing unit 120 can be higher, in order to obtain a more accurate three dimensional digital model. In addition, the three dimensional outline information sensing system 100 of the present invention can perform three dimensional sensing on an object having a more complex shape.

On the other hand, the variable focus image capturing device 110 is not limited to capturing the two dimensional images starting from an end (or the bottom) of the object 300. The variable focus image capturing device 110 can also capture the two dimensional images starting from a position behind the object 300. Therefore, the three dimensional outline information of the object 300 and surroundings can be obtained.

In addition, the three dimensional outline information sensing system 100 of the present invention can further comprise a storage unit 130 configured to store a plurality of two dimensional images of the object 300. As such, the processing unit 120 is not required to simultaneously compute the three dimensional outline information of the object 300 while controlling the variable focus image capturing device 110 to capture the two dimensional images. The processing unit 120 can obtain the three dimensional outline information of the object 300 by sequentially analyzing the two dimensional images stored in the storage unit 130. Therefore, a requirement for computing capacity of the processing unit 120 can be further reduced. Moreover, the three dimensional outline information (and the three dimensional digital model) of the object 300 can be also stored in the storage unit 130 for further processing.

On the other hand, the processing unit 120 can generate all-focused image according to the plurality of two dimensional images captured by the variable focus image capturing device 110. The processing unit 120 can obtain the three dimensional outline information of the object according to on-focus parts of the object 300 at corresponding focal lengths in the all focused image and the distance between the variable focus image capturing device 100 and the object 300. The all-focused image comprises essential information of the plurality of two dimensional images, wherein duplicate information of the plurality of two dimensional images is simplified or deleted. As such, loading of the processing unit 120 for computing the three dimensional outline information can be reduced.

Figure 3:
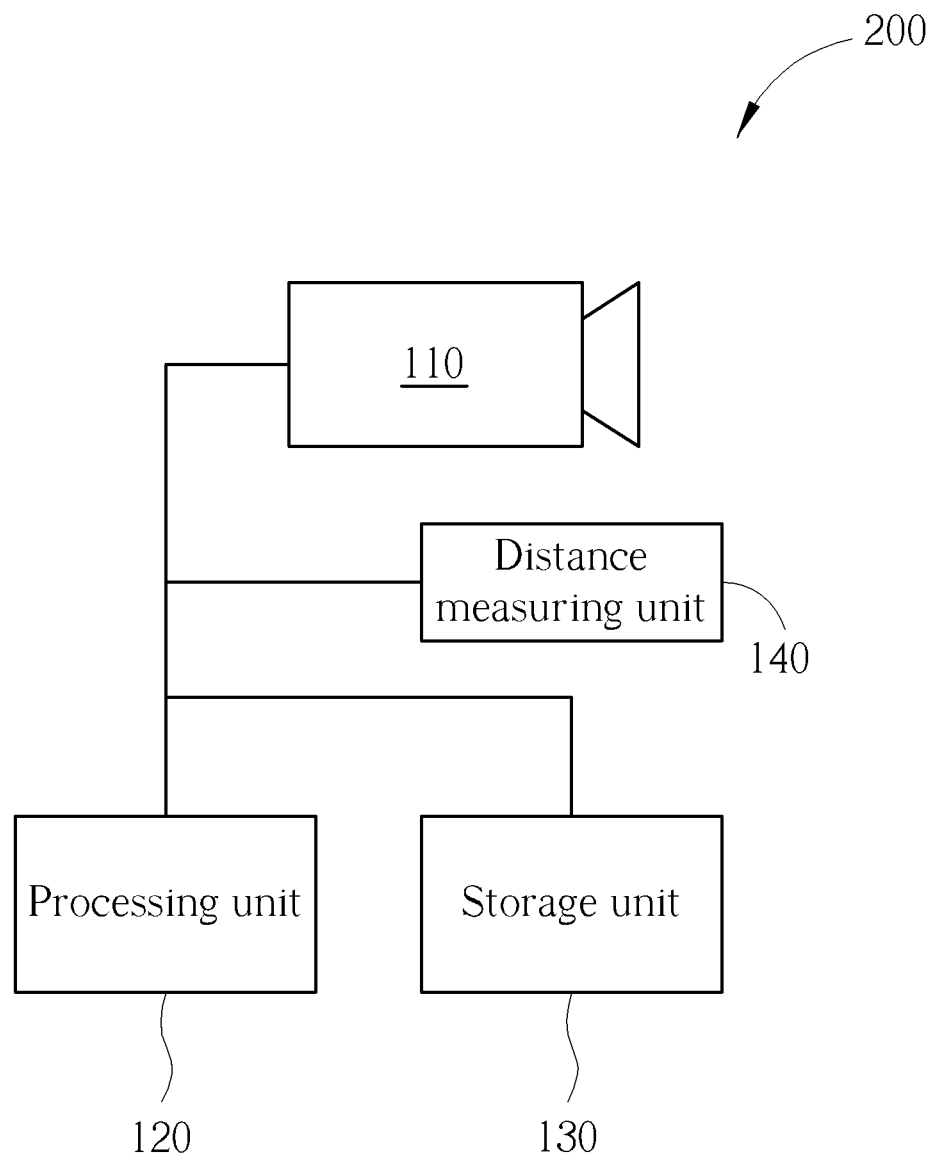
FIG. 3 is a diagram showing a three dimensional outline information sensing system according to a second embodiment of the present invention.

Please refer to FIG. 3. FIG. 3 is a diagram showing a three dimensional outline information sensing system according to a second embodiment of the present invention. As shown in FIG. 3, the three dimensional outline information sensing system 200 of the present invention further comprises a distance measuring unit 140 configured to measure the distance between the variable focus image capturing device 110 and the object. According to the above arrangement, the three dimensional outline information sensing system 200 does not need to be arranged at a position a predetermined distance apart from the object for sensing the three dimensional outline information of the object. The three dimensional outline information sensing system 200 can directly sense the three dimensional outline information of the object at a non-specified position according to the distance measured by the distance measuring unit 140. Notably, the distance measuring unit 140 may be a range meter, a laser sensor, a radar, a lidar, an IR distance sensor or an optical sensor, and not limited herein.

Figure 4:
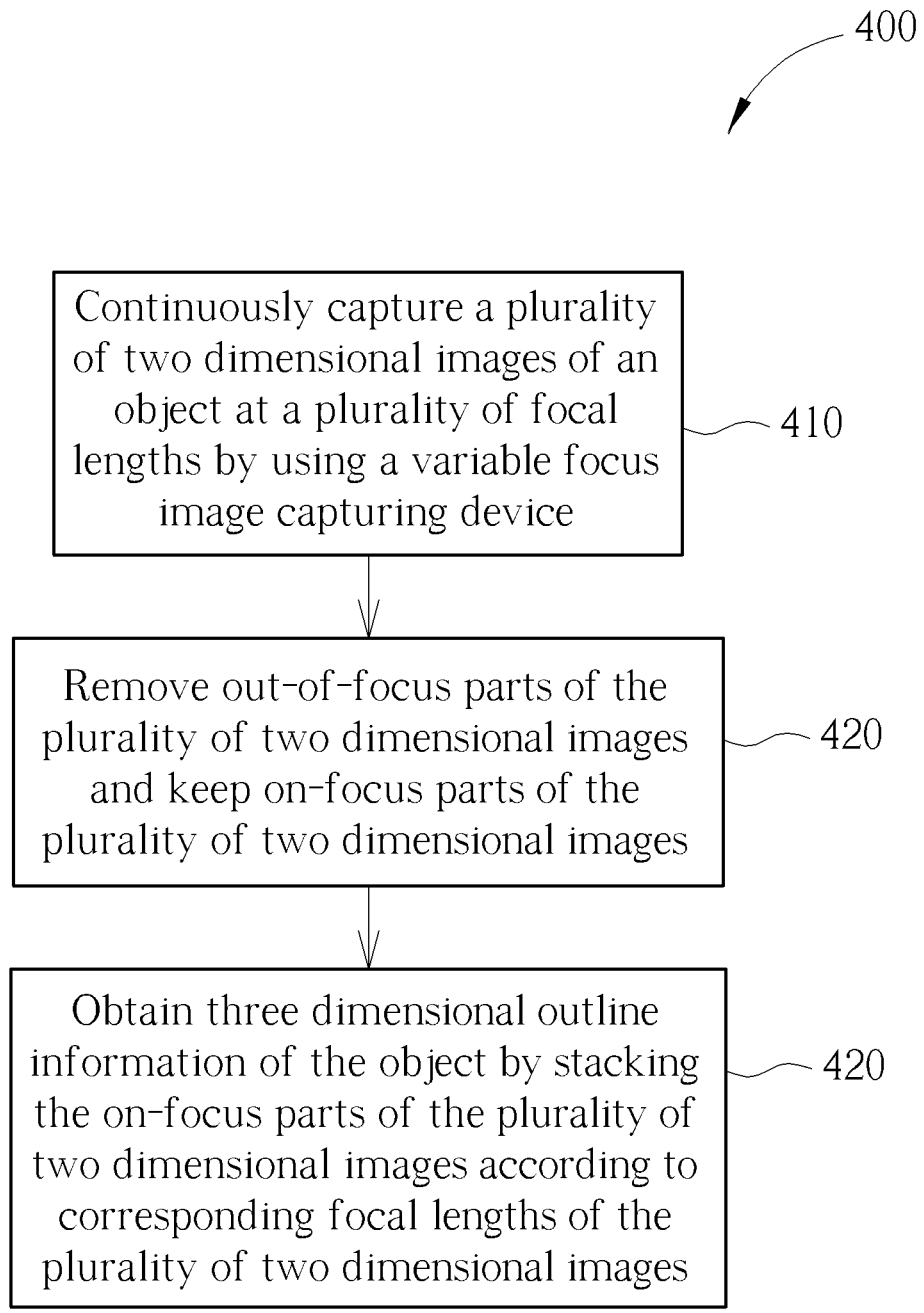
FIG. 4 is a flowchart showing a three dimensional outline information sensing method of the present invention.

Please refer to FIG. 4. FIG. 4 is a flowchart showing a three dimensional outline information sensing method of the present invention. The three dimensional outline information sensing method of the present invention comprises the following steps:

Step 410: Continuously capture a plurality of two dimensional images of an object at a plurality of focal lengths by using a variable focus image capturing device;

Step 420: Remove out-of-focus parts of the plurality of two dimensional images and keep on-focus parts of the plurality of two dimensional images; and Step 430: Obtain three dimensional outline information of the object by stacking the on-focus parts of the plurality of two dimensional images according to corresponding focal lengths of the plurality of two dimensional images.

In contrast to the prior art, the three dimensional outline information sensing system and sensing method can obtain the three dimensional outline information of the object according to the plurality of two dimensional images captured at different focal lengths. The present invention can perform three dimensional sensing on the object by using a variable focus image capturing device and an appropriate processing unit, in order to build the three dimensional digital model of the object. Therefore, the three dimensional outline information sensing system of the present invention has a simpler structure and higher three dimensional sensing efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A three dimensional outline information sensing system, comprising:
a variable focus image capturing device, configured to continuously capture a plurality of two dimensional images of an object at a plurality of focal lengths; and
a processing unit, configured to remove out-of-focus parts of the plurality of two dimensional images and keep on-focus parts of the plurality of two dimensional images, and obtain three dimensional outline information of the object by stacking the on-focus parts of the plurality of two dimensional images according to corresponding focal lengths of the plurality of two dimensional images;
wherein the processing unit is configured to obtain the three dimensional outline information of the object by stacking the on-focus parts of the plurality of two dimensional images according to ratios of focus distances between the corresponding focal lengths of the plurality of two dimensional images without reducing sizes of the plurality of two dimensional images.

2. The three dimensional outline information sensing system of claim 1 further comprising a distance measuring unit configured to measure a distance between the variable focus image capturing device and the object, wherein the processing unit is configured to obtain the three dimensional outline information of the object by stacking the on-focus parts of the plurality of two dimensional images according to the corresponding focal lengths of the plurality of two dimensional images and the distance between the variable focus image capturing device and the object.

3. The three dimensional outline information sensing system of claim 1 further comprising a storage unit configured to store the plurality of two dimensional images and/or the three dimensional outline information of the object.

4. The three dimensional outline information sensing system of claim 1, wherein the processing unit is further configured to generate all-focused image data according to the plurality of two dimensional images, the processing unit is configured to obtain the three dimensional outline information of the object according to on-focus parts of corresponding focal lengths of the object in the all-focused image data and a distance between the variable focus image capturing device and the object.

5. A three dimensional outline information sensing method, comprising:
continuously capturing a plurality of two dimensional images of an object at a plurality of focal lengths by using a variable focus image capturing device;
removing out-of-focus parts of the plurality of two dimensional images and keeping on-focus parts of the plurality of two dimensional images; and
obtaining three dimensional outline information of the object by stacking the on-focus parts of the plurality of two dimensional images according to corresponding focal lengths of the plurality of two dimensional images;
wherein obtaining the three dimensional outline information of the object by stacking the on-focus parts of the plurality of two dimensional images according to the corresponding focal lengths of the plurality of two dimensional images without reducing sizes of the plurality of two dimensional images.

6. The three dimensional outline information sensing method of claim 5 further comprising measuring a distance between the variable focus image capturing device and the object, wherein obtaining the three dimensional outline information of the object by stacking the on-focus parts of the plurality of two dimensional images according to the corresponding focal lengths of the plurality of two dimensional images, is obtaining the three dimensional outline information of the object by stacking the on-focus parts of the plurality of two dimensional images according to the corresponding focal lengths of the plurality of two dimensional images and the distance between the variable focus image capturing device and the object.

7. The three dimensional outline information sensing method of claim 5 further comprising storing the plurality of two dimensional images and/or the three dimensional outline information of the object.

8. The three dimensional outline information sensing method of claim 5, wherein obtaining the three dimensional outline information of the object by stacking the on-focus parts of the plurality of two dimensional images according to ratios of focus distances between the corresponding focal lengths of the plurality of two dimensional images.

9. The three dimensional outline information sensing method of claim 5 further comprising generating all-focused image data according to the plurality of two dimensional images, wherein obtaining the three dimensional outline information of the object according to the corresponding focal lengths of the plurality of two dimensional images, is obtaining the three dimensional outline information according to on-focus parts of corresponding focal lengths of the object in the all-focused image data and a distance between the variable focus image capturing device and the object.

* * * * *